United States Patent
Roy

(10) Patent No.: US 10,892,498 B2
(45) Date of Patent: Jan. 12, 2021

(54) FUEL CELL SPACER AND ELECTROLYTE RESERVOIR

(71) Applicant: DOOSAN FUEL CELL AMERICA, INC., South Windsor, CT (US)

(72) Inventor: Donald J. L. Roy, Enfield, CT (US)

(73) Assignee: DOOSAN FUEL CELL AMERICA, INC., South Windsor, CT (US)

( * ) Notice: Subject to any disclaimer, the term of this patent is extended or adjusted under 35 U.S.C. 154(b) by 99 days.

(21) Appl. No.: 16/198,178

(22) Filed: Nov. 21, 2018

(65) Prior Publication Data

US 2020/0161668 A1 May 21, 2020

(51) Int. Cl.
*H01M 8/026* (2016.01)
*H01M 8/0213* (2016.01)
*H01M 8/2484* (2016.01)
*H01M 8/086* (2016.01)

(52) U.S. Cl.
CPC ......... *H01M 8/026* (2013.01); *H01M 8/0213* (2013.01); *H01M 8/086* (2013.01); *H01M 8/2484* (2016.02); *H01M 2300/0008* (2013.01)

(58) Field of Classification Search
CPC .... H01M 8/026; H01M 8/2484; H01M 8/086; H01M 8/0213; H01M 2300/0008
USPC ....................................................... 429/457
See application file for complete search history.

(56) References Cited

U.S. PATENT DOCUMENTS

| | | | |
|---|---|---|---|
| 4,366,211 A | 12/1982 | Pollack | |
| 7,070,875 B2 | 7/2006 | Hoffmann | |
| 7,807,313 B2 | 10/2010 | Kaye et al. | |
| 8,216,737 B2 | 7/2012 | Sommer et al. | |
| 8,298,719 B2 | 10/2012 | Mossman et al. | |
| 8,546,034 B2 | 10/2013 | Katano et al. | |
| 9,166,235 B2 | 10/2015 | Katano | |
| 9,172,100 B2 | 10/2015 | Hotta et al. | |
| 9,184,453 B2 | 11/2015 | Drouhault et al. | |
| 9,231,259 B2 | 1/2016 | Kobayashi et al. | |
| 9,991,525 B2 | 6/2018 | Takayama et al. | |
| 2005/0282060 A1 | 12/2005 | DeFillippis et al. | |
| 2010/0122461 A1 | 5/2010 | Minas et al. | |
| 2014/0045088 A1 | 2/2014 | Drouhault et al. | |

(Continued)

FOREIGN PATENT DOCUMENTS

| | | |
|---|---|---|
| JP | H07169473 A | 7/1995 |
| JP | H09219205 A | 8/1997 |
| JP | 6025667 B2 | 11/2016 |

OTHER PUBLICATIONS

International Search Report and Written Opinion of the International Searching Authority for International application No. PCT/US2019/062364 dated Mar. 10, 2020.

*Primary Examiner* — Gary D Harris
(74) *Attorney, Agent, or Firm* — Carlson, Gaskey & Olds

(57) ABSTRACT

An illustrative example fuel cell device includes a cell stack assembly of a plurality of fuel cells that each include an anode and a cathode. A pressure plate is situated near one end of the cell stack assembly. A spacer between the end of the cell stack assembly and the pressure plate has a length, a width, and a height. The height of the spacer defines a spacing between the pressure plate and the end of the cell stack assembly. The spacer has a plurality of ribs that define at least two fluid reservoirs. At least one of the ribs separates the fluid reservoirs so that fluid in one of the reservoirs is isolated from fluid in the other.

20 Claims, 2 Drawing Sheets

(56) References Cited

U.S. PATENT DOCUMENTS

| | | |
|---|---|---|
| 2015/0086886 A1 | 3/2015 | Blank et al. |
| 2016/0254564 A1 | 9/2016 | Takeyama et al. |
| 2017/0098852 A1* | 4/2017 | Carnevale ........... H01M 8/0202 |
| 2017/0110754 A1 | 4/2017 | Nishiyama et al. |

* cited by examiner

FUEL CELL SPACER AND ELECTROLYTE RESERVOIR

BACKGROUND

Fuel cells generate electricity based on an electrochemical reaction between reactants such as hydrogen and oxygen. Some fuel cells include a liquid electrolyte to facilitate the electrochemical reaction. Phosphoric acid is one example electrolyte.

A challenge presented by many phosphoric acid fuel cells is maintaining a sufficient amount of phosphoric acid over time. The useful lifetime of such a fuel cell depends on the amount of phosphoric acid available and how that is managed or maintained within the fuel cell device.

In some known fuel cell devices, liquid electrolyte condenses in the fuel manifolds and accumulates near a lower end of the device. Some configurations include an anode pressure plate that has a thickness that keeps the fuel cells near the lower end from the space near the bottom of the manifold where such acid may be retained. The pressure plate thickness has to be large enough to prevent any accumulated acid from reaching the cell stack assembly because if it does, it will flood the fuel cell(s) closest to the pressure plate resulting in a shutdown of the entire device.

SUMMARY

An illustrative example fuel cell device includes a cell stack assembly of a plurality of fuel cells that each include an anode and a cathode. A pressure plate is situated near one end of the cell stack assembly. A spacer between the end of the cell stack assembly and the pressure plate has a length, a width, and a height. The height of the spacer defines a spacing between the pressure plate and the end of the cell stack assembly. The spacer has a plurality of ribs that define at least two fluid reservoirs. At least one of the ribs separates the fluid reservoirs so that fluid in one of the reservoirs is isolated from fluid in the other.

In an embodiment having one or more features of the fuel cell device of the previous paragraph, the plurality of ribs includes a set of strengthening ribs that define cavities within the at least two reservoirs. A plurality of channels are respectively associated with at least some of the strengthening ribs and the channels allow fluid to pass between cavities within a respective one of the at least two reservoirs.

In an embodiment having one or more features of the fuel cell device of any of the previous paragraphs, the strengthening ribs have a rib height that corresponds to a depth of the respective one of the at least two reservoirs.

In an embodiment having one or more features of the fuel cell device of any of the previous paragraphs, the at least two reservoirs are open toward the pressure plate and a body of the spacer isolates the at least two reservoirs from the end of the cell stack assembly.

In an embodiment having one or more features of the fuel cell device of any of the previous paragraphs, the fuel cells are liquid electrolyte fuel cells and the at least two reservoirs contain some of the liquid electrolyte.

In an embodiment having one or more features of the fuel cell device of any of the previous paragraphs, the liquid electrolyte comprises phosphoric acid.

In an embodiment having one or more features of the fuel cell device of any of the previous paragraphs, a manifold is configured to deliver a reactant to the fuel cells. The manifold includes a portion adjacent the spacer. The at least two reservoirs are respectively in fluid communication with the portion of the manifold.

In an embodiment having one or more features of the fuel cell device of any of the previous paragraphs, a first one of the at least two reservoirs is in fluid communication with a first section of the manifold through which a first turn of fuel cell fuel passes. A second one of the at least two reservoirs is in fluid communication with a second section of the manifold through which a second turn of fuel cell fuel passes.

In an embodiment having one or more features of the fuel cell device of any of the previous paragraphs, the plurality of ribs includes an outer edge rib for each of the at least two reservoirs. the outer edge rib for the first one of the at least two reservoirs includes at least one channel through which fluid may pass between the first section of the manifold and the first one of the at least two reservoirs. the outer edge rib for the second one of the at least two reservoirs includes at least one channel through which fluid may pass between the second section of the manifold and the second one of the at least two reservoirs.

In an embodiment having one or more features of the fuel cell device of any of the previous paragraphs, the height is less than 40 mm.

In an embodiment having one or more features of the fuel cell device of any of the previous paragraphs, the height is between 35 mm and 20 mm.

In an embodiment having one or more features of the fuel cell device of any of the previous paragraphs, the spacer comprises an electrically conductive material that is configured to carry electrical current from the cell stack assembly to the pressure plate.

In an embodiment having one or more features of the fuel cell device of any of the previous paragraphs, the spacer comprises graphite.

Various features and advantages of at least one disclosed example embodiment will become apparent to those skilled in the art from the following detailed description. The drawings that accompany the detailed description can be briefly described as follows.

DETAILED DESCRIPTION

Embodiments of this invention include a spacer that can be situated between a cell stack assembly and a pressure plate. The spacer defines at least two reservoirs for fluid, which are isolated from each other. With such a spacer, cost savings can be realized by requiring less material for the pressure plate and manifold or by allowing for additional fuel cells to be added to the cell stack assembly to provide higher efficiency or output.

Figure 1:
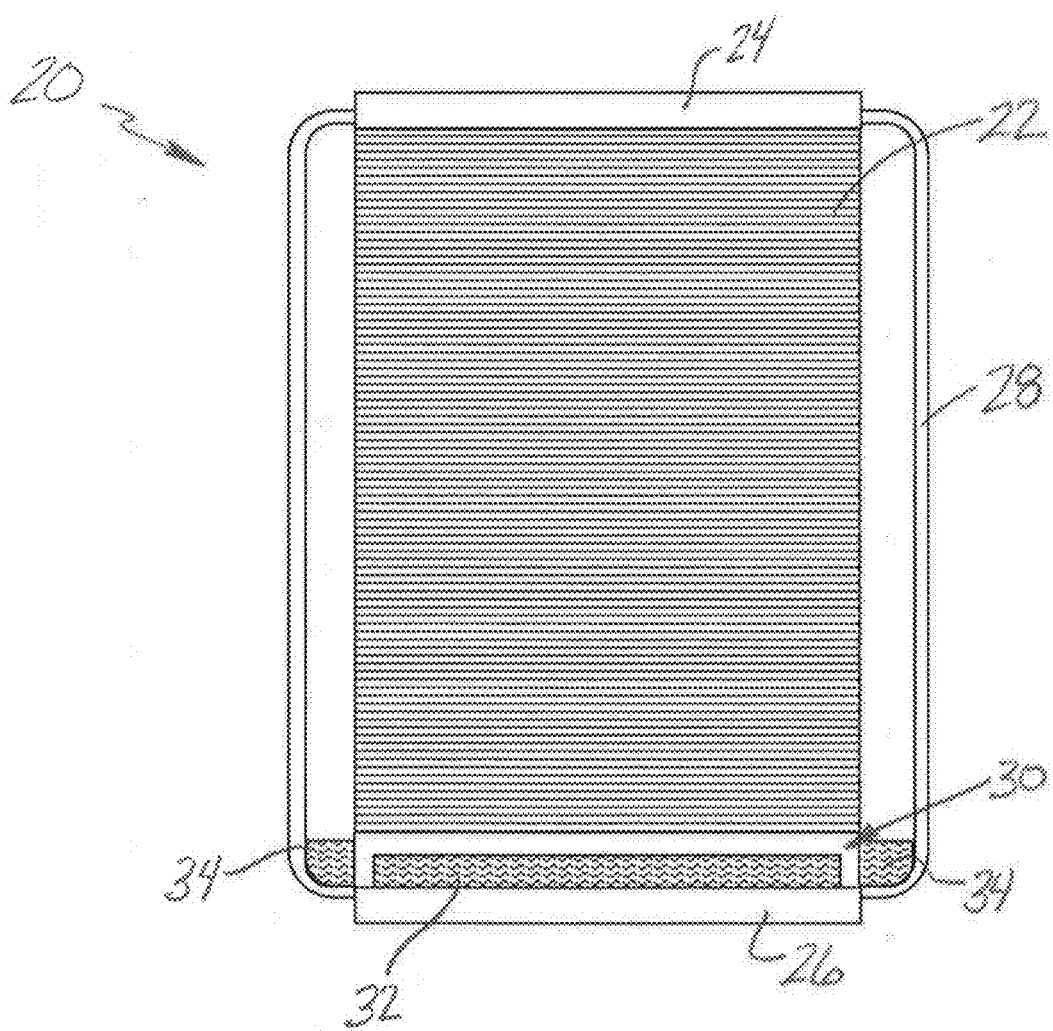
FIG. 1 schematically illustrates an example fuel cell device designed according to an embodiment of this invention.

FIG. 1 schematically shows a fuel cell device 20 that may be incorporated into a fuel cell power plant. A cell stack assembly 22 includes a plurality of fuel cells each having an anode and a cathode. The fuel cells in this example embodiment are phosphoric acid fuel cells that rely upon phosphoric acid as a liquid electrolyte within a matrix between the anode and cathode of each fuel cell.

The cell stack assembly 22 is maintained between pressure plates 24 and 26 near opposite ends of the cell stack assembly 22. A manifold 28 facilitates supplying reactants, such as hydrogen and oxygen, to the cell stack assembly 22.

A spacer 30 is situated between the pressure plate 26 and the adjacent end of the cell stack assembly 22. The spacer 30 defines at least two reservoirs where fluid may accumulate between the cell stack assembly 22 and the pressure plate 26. In the illustration, phosphoric acid is schematically shown at 32 in a reservoir established by the spacer 30. Additional phosphoric acid at 34 is retained in a portion of the manifold 28 that is situated adjacent the spacer 30.

Figure 2:
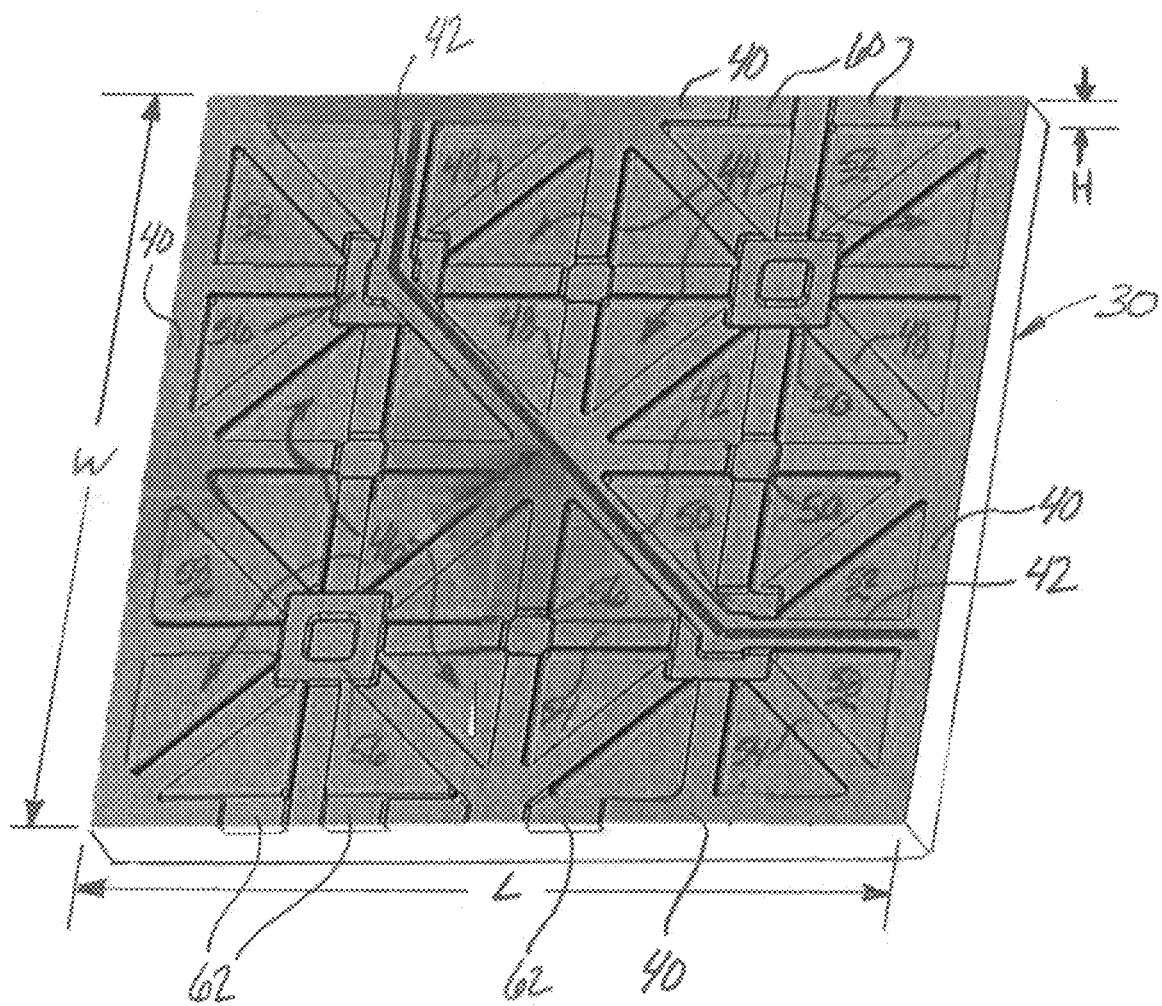
FIG. 2 schematically illustrates an example embodiment of a spacer designed according to an embodiment of this invention.

FIG. 2 illustrates an example spacer 30. A body of the spacer 30 has a length L, a width W, and a height H. The length is greater than the height and the width is greater than the height. In the illustrated example, the length and width are approximately equal although that is not required. The height H establishes a spacing between an end of the cell stack assembly 22 and the pressure plate 26.

The spacer 30 has a plurality of ribs including outer edge ribs 40 and at least one divider rib 42 that collectively define at least two reservoirs 44 and 46. The divider rib 42 isolates the reservoir 44 from the reservoir 46. Fluid in either reservoir 44 or 46 is isolated from fluid in the other reservoir.

The illustrated example includes additional ribs that are referred to as strengthening ribs because they provide additional strength to the spacer 30 and withstand the forces urging the pressure plate 26 toward the end of the cell stack assembly 22. Strengthening ribs 48 are situated within the reservoir 44. The strengthening ribs 48 have a thickness in the height direction of the spacer 30 that corresponds to a depth of the reservoir 44. A plurality of channels 50 are associated with at least some of the strengthening ribs 48 to allow for fluid within the reservoir 44 to flow between and among cavities 52 that are defined by the strengthening ribs 48 within the reservoir 44.

Similar strengthening ribs 54 are provided within the reservoir 46. Channels or passages 56 are associated with at least some of the strengthening ribs 54 to allow for fluid communication among cavities 58 within the reservoir 46.

One of the outer edge ribs 40 includes at least one channel 60 that allows fluid communication between the reservoir 44 and a first portion of the manifold 28 where the phosphoric acid is situated at 34 in FIG. 1, for example. An oppositely facing outer edge rib 40 includes at least one channel 62 to allow for fluid communication between the reservoir 46 and the adjacent portion of the manifold 28 where phosphoric acid 34 may accumulate.

In the illustrated example, phosphoric acid associated with a first fuel turn of the cell stack assembly 22 accumulates in a portion of the manifold adjacent the channels 62, which allow such phosphoric acid to enter into and accumulate within the reservoir 46. Phosphoric acid associated with a second fuel turn can accumulate within the portion of the manifold 28 adjacent channels 60 where such phosphoric acid may accumulate within the reservoir 44.

There are several features of the illustrated example embodiment that provide improvements compared to previous fuel cell device designs. One aspect of utilizing a spacer 30 is that it decreases the required thickness of the pressure plate 26. The spacer 30 occupies space within the portion of the manifold 28 where phosphoric acid 34 may accumulate to prevent such phosphoric acid from flooding the lower cells of the cell stack assembly 22. The height H of the spacer 30 is significantly less than the thickness or height previously used for the pressure plate 26. This is possible because the spacer 30 includes at least the two reservoirs 44, 46 for retaining phosphoric acid. Without those reservoirs, the only location for phosphoric acid near the bottom of the device 20 was between the manifold 28 and the spacer. Instead of occupying over 150 mm of the bottom portion of the manifold 28 with a larger pressure plate, the spacer 30 includes at least two reservoirs to retain phosphoric acid within the space occupied by the reservoirs. The height H of the spacer 30, in some embodiments, is less than 40 mm Some fuel cell power plants will benefit from a spacer height of approximately 33 mm while other fuel cell power plant configurations will benefit from a spacer having a height H of approximately 23 mm Spacer heights between 35 mm and 20 mm are useful in many installations.

The decreased thickness or height of the spacer 30 provides on the order of 75% or 80% space savings, which translates into a more cost-effective fuel cell device. The additional space previously occupied by a thicker pressure plate may now be occupied with additional fuel cells in the cell stack assembly 22. This allows for providing greater efficiency and more power output within the same packaging envelope occupied by previous configurations. Alternatively, the size of the fuel cell device 20 may be reduced, which provides material cost savings by having a smaller manifold 28, smaller pressure plate, and a smaller overall footprint or packaging size for a fuel cell power plant. Either approach provides a lower levelized cost of electricity (LCOE). This is significant because those skilled in the art are striving to be able to reduce the cost of fuel cell power plants without sacrificing performance.

The spacer 30 comprises an electrically conductive material that carries electrical current from the fuel cells of the cell stack assembly 22 to the pressure plate 26. The spacer 30, in the illustrated example, comprises graphite, which has the beneficial feature of reducing electrical resistance and, therefore, voltage loss.

The reservoirs of the spacer 30 allow for storing additional phosphoric acid within a fuel cell device, which can contribute to longer fuel cell life.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A fuel cell device, comprising:
   a cell stack assembly including a plurality of fuel cells that each include an anode and a cathode;
   a pressure plate near one end of the cell stack assembly; and
   an electrically conductive component between the end of the cell stack assembly and the pressure plate, the electrically conductive component having a length, a width and a height, the height defining a spacing between the pressure plate and the end of the cell stack assembly, the length being greater than the height, the width being greater than the height, the electrically conductive component having a plurality of ribs that define at least two fluid reservoirs, at least one of the ribs separating the at least two fluid reservoirs so that fluid in one of the at least two fluid reservoirs is isolated from fluid in the other of the at least two fluid reservoirs.

2. The fuel cell device of claim 1, wherein
the plurality of ribs includes a set of strengthening ribs that define cavities within the at least two reservoirs;
a plurality of channels are respectively associated with at least some of the strengthening ribs; and
the channels allow fluid to pass between cavities within a respective one of the at least two reservoirs.

3. The fuel cell device of claim 2, wherein the strengthening ribs have a rib height that corresponds to a depth of the respective one of the at least two reservoirs.

4. The fuel cell device of claim 1, wherein
the at least two reservoirs are open toward the pressure plate; and
a body of the electrically conductive component isolates the at least two reservoirs from the end of the cell stack assembly.

5. The fuel cell device of claim 1, wherein
the fuel cells are liquid electrolyte fuel cells; and
the at least two reservoirs contain some of the liquid electrolyte.

6. The fuel cell device of claim 5, wherein the liquid electrolyte comprises phosphoric acid.

7. The fuel cell device of claim 1, comprising a manifold configured to deliver a reactant to the fuel cells and wherein
the manifold includes a portion adjacent the electrically conductive component; and
wherein the at least two reservoirs are respectively in fluid communication with the portion of the manifold.

8. The fuel cell device of claim 7, wherein
a first one of the at least two reservoirs is in fluid communication with a first section of the manifold through which a first turn of fuel cell fuel passes; and
a second one of the at least two reservoirs is in fluid communication with a second section of the manifold through which a second turn of fuel cell fuel passes.

9. The fuel cell device of claim 8, wherein
the plurality of ribs includes an outer edge rib for each of the at least two reservoirs;
the outer edge rib for the first one of the at least two reservoirs includes at least one channel through which fluid may pass between the first section of the manifold and the first one of the at least two reservoirs; and
the outer edge rib for the second one of the at least two reservoirs includes at least one channel through which fluid may pass between the second section of the manifold and the second one of the at least two reservoirs.

10. The fuel cell device of claim 1, wherein the height of the electrically conductive component is less than 40 mm.

11. The fuel cell device of claim 10, wherein the height of the electrically conductive component is between 35 mm and 20 mm.

12. The fuel cell device of claim 1, wherein the electrically conductive component is a spacer that is configured to carry electrical current from the cell stack assembly to the pressure plate.

13. The fuel cell device of claim 12, wherein the spacer comprises graphite.

14. A fuel cell device, comprising:
a cell stack assembly including a plurality of fuel cells that each include an anode and a cathode;
a pressure plate near one end of the cell stack assembly;
a component between the end of the cell stack assembly and the pressure plate, the component having a length, a width and a height, the height defining a spacing between the pressure plate and the end of the cell stack assembly, the length being greater than the height, the width being greater than the height, the component having a plurality of ribs that define at least two fluid reservoirs, at least one of the ribs separating the at least two fluid reservoirs so that fluid in one of the at least two fluid reservoirs is isolated from fluid in the other of the at least two fluid reservoirs;
a manifold configured to deliver a reactant to the fuel cells, the manifold including a portion adjacent the component, and the at least two reservoirs are respectively in fluid communication with the portion of the manifold;
wherein a first one of the at least two reservoirs is in fluid communication with a first section of the manifold through which a first turn of fuel cell fuel passes; and
wherein a second one of the at least two reservoirs is in fluid communication with a second section of the manifold through which a second turn of fuel cell fuel passes.

15. The fuel cell device of claim 14 wherein
the plurality of ribs includes an outer edge rib for each of the at least two reservoirs;
the outer edge rib for the first one of the at least two reservoirs includes at least one channel through which fluid may pass between the first section of the manifold and the first one of the at least two reservoirs; and
the outer edge rib for the second one of the at least two reservoirs includes at least one channel through which fluid may pass between the second section of the manifold and the second one of the at least two reservoirs.

16. The fuel cell device of claim 14, wherein the component is an electrically conductive spacer configured to carry electrical current from the cell stack assembly to the pressure plate.

17. The fuel cell device of claim 14, wherein
the plurality of ribs includes a set of strengthening ribs that define cavities within the at least two reservoirs;
a plurality of channels are respectively associated with at least some of the strengthening ribs; and
the channels allow fluid to pass between cavities within a respective one of the at least two reservoirs.

18. The fuel cell device of claim 17, wherein the strengthening ribs have a rib height that corresponds to a depth of the respective one of the at least two reservoirs.

19. The fuel cell device of claim 14, wherein
the at least two reservoirs are open toward the pressure plate; and
a body of the component isolates the at least two reservoirs from the end of the cell stack assembly.

20. The fuel cell device of claim 14, wherein
the fuel cells are phosphoric acid fuel cells; and
the at least two reservoirs contain some of the phosphoric acid.

* * * * *